United States Patent
Chapeau

(10) Patent No.: US 12,246,692 B2
(45) Date of Patent: Mar. 11, 2025

(54) TRAILER IMMOBILIZATION IN A TRANSPORT REFRIGERATION SYSTEM

(71) Applicant: Carrier Corporation, Palm Beach Gardens, FL (US)

(72) Inventor: Lucas Chapeau, Isneauville (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 188 days.

(21) Appl. No.: 18/177,486

(22) Filed: Mar. 2, 2023

(65) Prior Publication Data
US 2023/0286477 A1    Sep. 14, 2023

Related U.S. Application Data

(60) Provisional application No. 63/317,613, filed on Mar. 8, 2022.

(51) Int. Cl.
*B60T 8/17*    (2006.01)
*B60P 3/20*    (2006.01)
*F25D 11/00*   (2006.01)

(52) U.S. Cl.
CPC .............. *B60T 8/1708* (2013.01); *B60P 3/20* (2013.01); *F25D 11/003* (2013.01)

(58) Field of Classification Search
CPC ......... B60T 8/1708; B60P 3/20; F25D 11/003
See application file for complete search history.

(56) References Cited

U.S. PATENT DOCUMENTS

| | | |
|---|---|---|
| 3,720,842 A | 3/1973 | Martin et al. |
| 6,712,171 B2 | 3/2004 | Farmer |
| 7,791,217 B2 | 9/2010 | Kamaga |
| 8,210,306 B2 | 7/2012 | Zuck et al. |
| 8,720,968 B2 | 5/2014 | Zalan et al. |
| 8,853,996 B2 | 10/2014 | Sekido et al. |
| 8,863,870 B2 | 10/2014 | Gwozdek et al. |
| 8,866,437 B2 | 10/2014 | Ichikawa |
| 8,944,477 B2 | 2/2015 | Proefke et al. |
| 9,061,598 B2 | 6/2015 | Ochocinski et al. |
| 9,093,788 B2 | 7/2015 | Lamb |
| 9,108,517 B2 | 8/2015 | Crombez |

(Continued)

FOREIGN PATENT DOCUMENTS

| | | |
|---|---|---|
| CN | 101617454 A | 12/2009 |
| CN | 107143222 A | 9/2017 |

(Continued)

OTHER PUBLICATIONS

European Search Report for Application No. 22151883.0; Issued Jul. 4, 2022; 11 Pages.

*Primary Examiner* — Jacob M Amick

(74) *Attorney, Agent, or Firm* — CANTOR COLBURN LLP

(57) ABSTRACT

A transport refrigeration system includes a trailer having a brake; a transport refrigeration unit mounted to the trailer, transport refrigeration unit configured to cool a cargo compartment of the trailer; a socket configured to provide a connection with shore power, the socket contained in an enclosure having an access panel; a switch configured to detect opening and closing of the access panel; a controller in communication with the switch, the controller configured to engage or disengage the brake in response to the switch.

16 Claims, 4 Drawing Sheets

(56) References Cited

U.S. PATENT DOCUMENTS

| | | | |
|---|---|---|---|
| 9,327,594 B2 | 5/2016 | Georgi et al. | |
| 9,515,418 B2 | 12/2016 | Yoshizawa et al. | |
| 9,662,990 B2 | 5/2017 | Jeong et al. | |
| 10,457,158 B2 | 10/2019 | Namou et al. | |
| 10,723,231 B2 | 7/2020 | Sarkar et al. | |
| 10,875,497 B2 * | 12/2020 | Srnec | B60R 25/08 |
| 11,118,833 B2 | 9/2021 | Poolman et al. | |
| 2005/0062344 A1 * | 3/2005 | Holt | E05B 83/02 |
| | | | 303/7 |
| 2010/0320964 A1 | 12/2010 | Lathrop et al. | |
| 2012/0007554 A1 | 1/2012 | Kanamori et al. | |
| 2013/0193918 A1 * | 8/2013 | Sarkar | B60L 3/12 |
| | | | 320/109 |
| 2014/0021779 A1 | 1/2014 | Techmann | |
| 2015/0097525 A1 | 4/2015 | Dedona et al. | |
| 2015/0251551 A1 | 9/2015 | Mueller et al. | |
| 2016/0075175 A1 | 3/2016 | Biderman et al. | |
| 2017/0080817 A1 | 3/2017 | Hancasky et al. | |
| 2019/0302764 A1 | 10/2019 | Smith et al. | |
| 2020/0346514 A1 | 11/2020 | Saroka et al. | |

FOREIGN PATENT DOCUMENTS

| | | |
|---|---|---|
| EP | 2108538 A1 | 10/2009 |
| EP | 2169802 A1 | 3/2010 |
| EP | 2821277 A1 | 1/2015 |
| EP | 3790145 A1 | 3/2021 |
| JP | 2018196187 A | 12/2018 |
| WO | 2013052027 A2 | 4/2013 |
| WO | 2016133451 A1 | 8/2016 |
| WO | 2016133452 A1 | 8/2016 |
| WO | 2016133453 A1 | 12/2017 |
| WO | 2018007799 A1 | 1/2018 |
| WO | 2018013036 A1 | 1/2018 |
| WO | 2020069107 A1 | 4/2020 |

* cited by examiner

TRAILER IMMOBILIZATION IN A TRANSPORT REFRIGERATION SYSTEM

CROSS-REFERENCE TO RELATED APPLICATIONS

This application claims the benefit of U.S. Provisional Application No. 63/317,613, filed Mar. 8, 2022, all of which are incorporated herein by reference in their entirety.

BACKGROUND

The subject matter disclosed herein generally relates to transport refrigeration systems, and more specifically to immobilization of a trailer in a transport refrigeration system.

Transport refrigeration systems include a transport refrigeration unit that cools a cargo compartment of a trailer. The transport refrigeration unit may be connected to shore power when the trailer is not in motion.

BRIEF SUMMARY

According to one embodiment, a transport refrigeration system includes a trailer having a brake; a transport refrigeration unit mounted to the trailer, transport refrigeration unit configured to cool a cargo compartment of the trailer; a socket configured to provide a connection with shore power, the socket contained in an enclosure having an access panel; a switch configured to detect opening and closing of the access panel; a controller in communication with the switch, the controller configured to engage or disengage the brake in response to the switch.

In addition to one or more of the features described above, or as an alternative, further embodiments may include wherein the switch comprises a physical contact switch.

In addition to one or more of the features described above, or as an alternative, further embodiments may include wherein the switch comprises a magnetic switch.

In addition to one or more of the features described above, or as an alternative, further embodiments may include wherein the brake comprises a trailer electronic brake system.

In addition to one or more of the features described above, or as an alternative, further embodiments may include wherein the brake comprises a service brake.

In addition to one or more of the features described above, or as an alternative, further embodiments may include wherein the brake comprises a parking brake.

In addition to one or more of the features described above, or as an alternative, further embodiments may include wherein the access panel is hingedly attached to the enclosure.

In addition to one or more of the features described above, or as an alternative, further embodiments may include wherein the access panel is biased in a closed position.

According to another embodiment, a method of controlling a brake of a trailer, the trailer including a transport refrigeration unit mounted to the trailer, the method including: actuating the brake in response to a switch, the switch configured to detect opening and closing of an access panel to a socket, the socket configured to provide a connection between the transport refrigeration unit and shore power.

In addition to one or more of the features described above, or as an alternative, further embodiments of the method may include wherein the switch comprises a physical contact switch.

In addition to one or more of the features described above, or as an alternative, further embodiments of the method may include wherein the switch comprises a magnetic switch.

In addition to one or more of the features described above, or as an alternative, further embodiments of the method may include wherein the brake comprises a trailer electronic brake system.

In addition to one or more of the features described above, or as an alternative, further embodiments of the method may include wherein the brake comprises a service brake.

In addition to one or more of the features described above, or as an alternative, further embodiments of the method may include wherein the brake comprises a parking brake.

In addition to one or more of the features described above, or as an alternative, further embodiments of the method may include wherein the access panel is hingedly attached to the enclosure.

In addition to one or more of the features described above, or as an alternative, further embodiments of the method may include wherein the access panel is biased in a closed position.

Technical effects of embodiments of the present disclosure include the ability to immobilize a trailer in a transport refrigeration system when a shore power connection is detected.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

DETAILED DESCRIPTION

A detailed description of one or more embodiments of the disclosure are presented herein by way of exemplification and not limitation with reference to the Figures.

Figure 1:
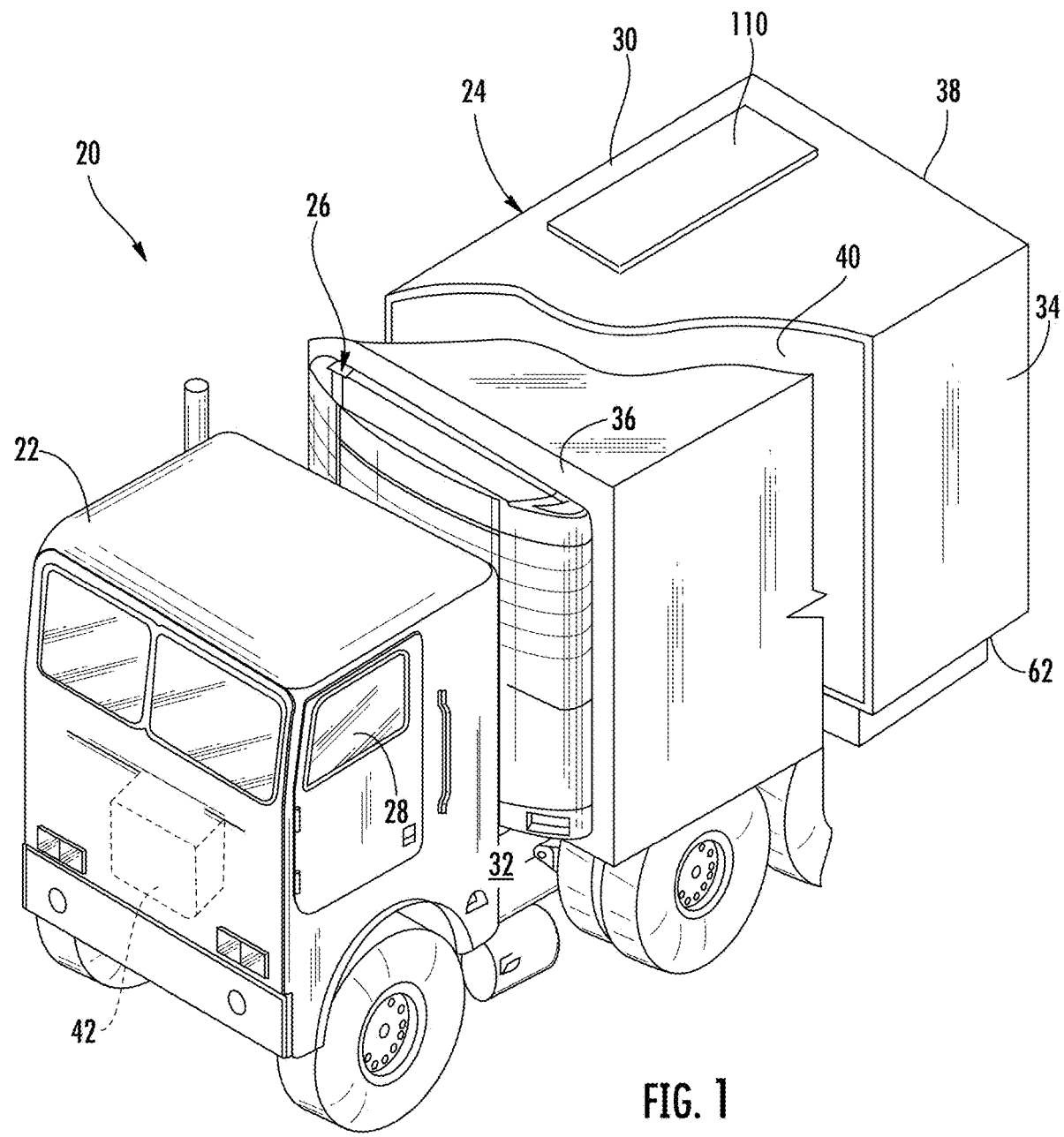
FIG. 1 is a perspective view of a transport refrigeration system having a transport refrigeration unit according to an example embodiment.

Referring to FIG. 1, a transport refrigeration system 20 of the present disclosure is illustrated. In the illustrated embodiment, the transport refrigeration system 20 may include a tractor 22, a trailer 24, and a transport refrigeration unit (TRU) 26. The trailer 24 may be pulled by the tractor 22. The trailer 24 may be a standalone unit that is pulled by the tractor 22, often referred to as a tractor-trailer. The trailer 24 may also be integrated with the tractor 22, often referred to as a refrigerated truck. Embodiments of this disclosure are also applicable to other vehicles equipped with an axle driven generator.

The tractor 22 may include an operator's compartment or cab 28 and a combustion engine 42 which is part of the powertrain or drive system of the tractor 22. In some instances the tractor 22 may be a hybrid or all electric configuration having electric motors to provide propulsive force for the vehicle. In some configurations the TRU system 26 may be engineless. In some embodiments, a small engine or the engine of the tractor 22 may be employed to power or partially power the TRU 26. The trailer 24 may be coupled to the tractor 22 and is thus pulled or propelled to desired destinations. The trailer 24 may include a top wall 30, a bottom wall 32 opposed to and spaced from the top wall 30, two side walls 34 spaced from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a trailer 24 to provide one or more desired environmental parameters, for example temperature, pressure, humidity, carbon dioxide, ethylene, ozone, light exposure, vibration exposure, and other conditions to the cargo compartment 40.

The trailer 24 is generally constructed to store a cargo (not shown) in the compartment 40. The TRU 26 is generally integrated into the trailer 24 and may be mounted to the front wall 36. The cargo is maintained at a desired temperature by cooling of the compartment 40 via the TRU 26 that circulates refrigerated airflow into and through the cargo compartment 40 of the trailer 24. It is further contemplated and understood that the TRU 26 may be applied to any transport compartments (e.g., shipping or transport containers) and not necessarily those used in tractor trailer systems. Furthermore, the trailer 24 may be a part of the of the tractor 22 or constructed to be removed from a framework and wheels (not shown) of the trailer 24 for alternative shipping means (e.g., marine, railroad, flight, and others).

Figure 2:
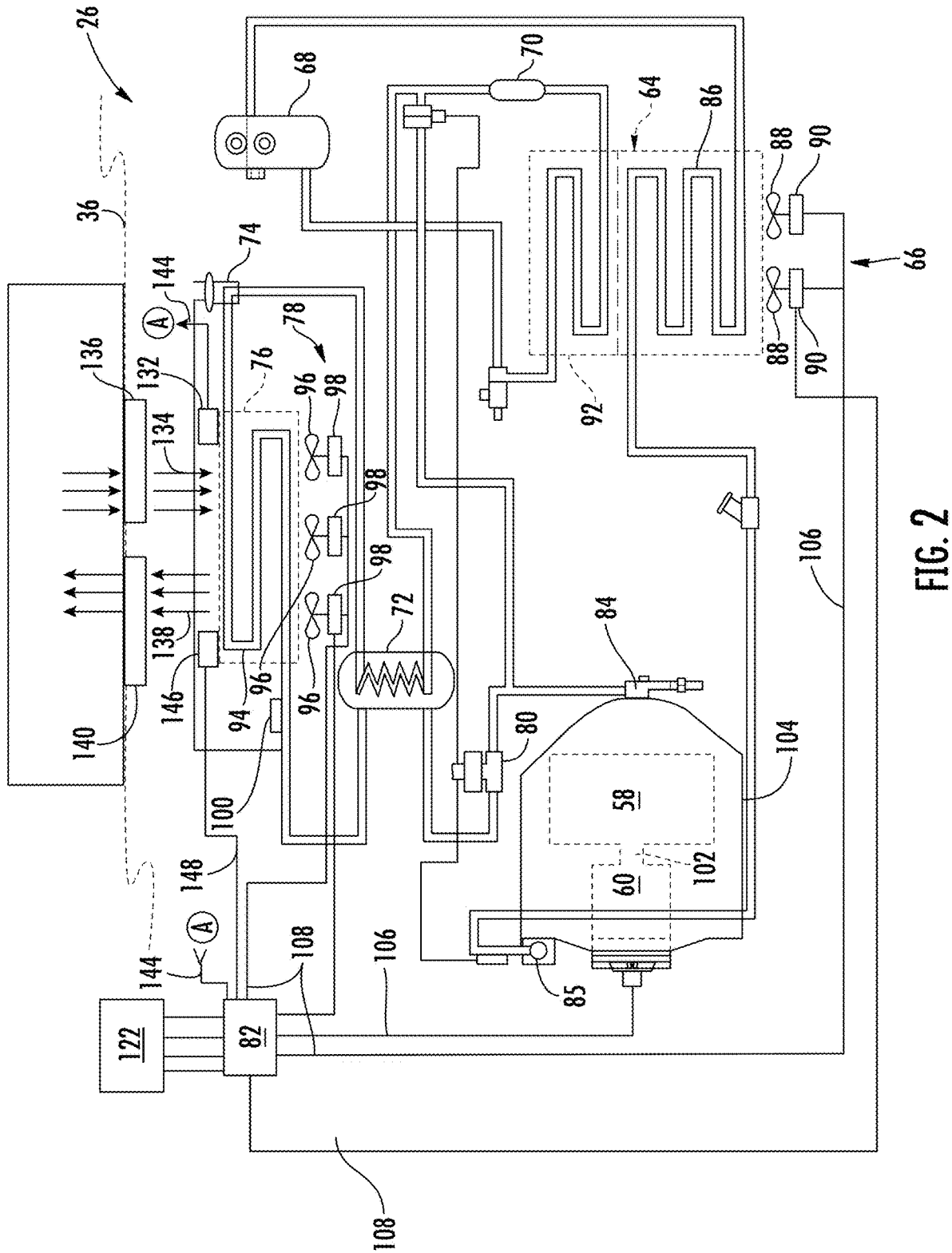
FIG. 2 is a schematic of a transport refrigeration unit according to an example embodiment.

Referring to FIG. 2, components of the TRU 26 may include a compressor 58, an electric compressor motor 60, a heat rejection heat exchanger 64 (e.g., a gas cooler or condenser) that may be air cooled, a condenser fan assembly 66, a receiver 68, a filter dryer 70, a heat exchanger 72, an expansion valve 74, a heat absorption heat exchanger 76 (e.g., an evaporator), an evaporator fan assembly 78, a suction modulation valve 80, and a controller 82 that may include a computer-based processor (e.g., microprocessor) and the like as will be described further herein. Operation of the TRU 26 may best be understood by starting at the compressor 58, where the suction gas (e.g., natural refrigerant, hydro-fluorocarbon (HFC) R-404a, HFC R-134a . . . , etc.) enters the compressor 58 at a suction port 84 and is compressed to a higher temperature and pressure.

The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric. By removing latent heat, the refrigerant gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized and thereby cools the return air.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. The expansion valve 74 may be thermostatic or electrically adjustable. In an embodiment, as depicted, the expansion valve 74 is thermostatic. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system. In another embodiment, the expansion valve 74 could be an electronic expansion valve. In this case the expansion valve is commanded to a selected position by the controller 82 based on the operating conditions of the vapor compression cycle and the demands of the system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor 58.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Continuing with FIG. 2, with continued reference to FIG. 1. FIG. 2 also illustrates airflow through the TRU 26 and the cargo compartment 40. Airflow is circulated into and through and out of the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

A temperature sensor 142 (i.e., thermistor, thermocouples, RTD, and the like) is placed in the air stream, on the evaporator 76, at the return air intake 136, and the like, to monitor the temperature return airflow 134 from the cargo compartment 40. A sensor signal indicative of the return airflow temperature denoted RAT is operably connected via line 144 to the TRU controller 82 to facilitate control and operation of the TRU 26. Likewise, a temperature sensor 146 is placed in the supply airflow 138, on the evaporator 76, at the refrigeration unit outlet 140 to monitor the temperature of the supply airflow 138 directed into the cargo compartment 40. Likewise, a sensor signal indicative of the supply airflow temperature denoted SAT 14 is operably connected via line 148 to the TRU controller 82 to facilitate control and operation of the TRU 26.

The TRU 26 may be powered by various power sources denoted generally as 122. The power sources 122 may include, but not be limited to, an energy storage device (e.g., a battery), an engine driven generator, an axle driven generator, solar panels, shore power (when the TRU 26 is not in motion), etc. Each of the power sources 122 may be configured to selectively power the TRU 26 including compressor motor 60, the condenser fan motors 90, the evaporator fan motors 98, the controller 82, and other components of the TRU 26 that may include various solenoids and/or sensors). The controller 82, through a series of data and command signals over various pathways 108 may, for example, control the application of power to the electric motors 60, 90, 98 as dictated by the cooling needs of the TRU 26.

The TRU 26 may include an AC or DC architecture with selected components employing alternating current (AC), and others employing direct current (DC). For example, in an embodiment, the motors 60, 90, 98 may be configured as AC motors, while in other embodiments, the motors 60, 90, 98 may be configured as DC motors. The operation of the of the power sources 122 as they supply power to the TRU 26 may be managed and monitored by the controller 82.

Figure 3:
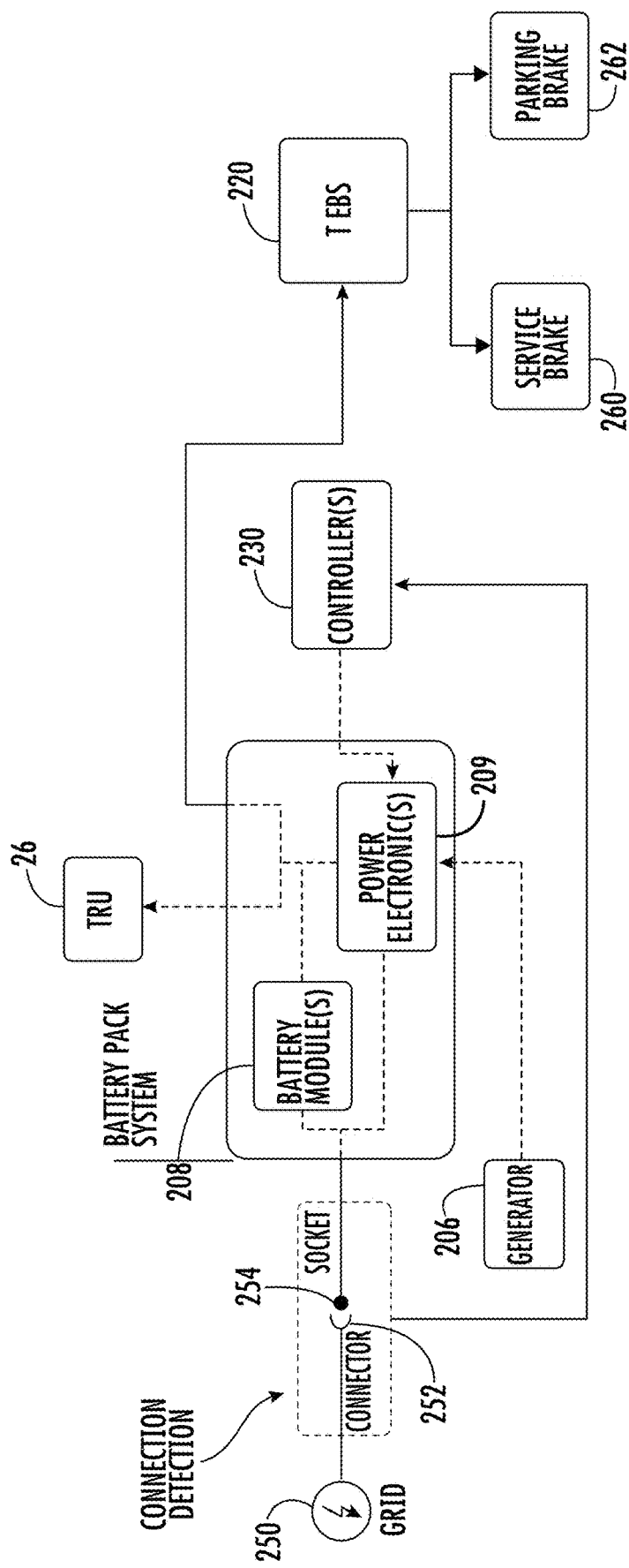
FIG. 3 depicts interconnections between various components of the transport refrigeration system according to an example embodiment.

FIG. 3 depicts interconnections between various components of the transport refrigeration system 20 according to an example embodiment. The TRU 26 may be powered by a battery 208 and/or a generator 206 (e.g., an axle mounted generator) when the transport refrigeration system 20 is in motion. The battery 208 may include a plurality of batteries, battery modules, battery cells, etc. The term battery is intended to include a variety of battery configurations. The TRU 26 may be powered by shore power 250 (e.g., 480 VAC) when the transport refrigeration system 20 is parked. The battery 208, generator 206 and shore power 250 serve as a power source 122 for supplying power to the TRU 26. Power output from the generator 206 and/or shore power 250 may be used to charge the battery 208. Power electronics 209 provide power conversions, such as AC to AC, AC to DC, DC to DC and/or DC to AC, necessary to power components of the TRU 26 and/or charge the battery 208.

Shore power 250 is connected to the TRU 26 using a connector 252 and a socket 254. The connector 252 and the socket 254 are described in further detail with reference to FIGS. 4 and 5.

A controller 230 (shown in FIG. 3) is in communication with a switch 280 (FIG. 4) proximate to the socket 254. The controller 230 may include a computer-based processor (e.g., microprocessor). The controller 230 may be implemented by the TRU controller 82. The controller 230 is also connected with a trailer electronic braking system (T-EBS) 220. Communication between the T-EBS 220 and the controller 230 may be a wired connection, such as a CAN bus. The controller 230 may also communicate with the T-EBS 220 through the power electronics 209. The T-EBS 220 controls one or more brakes to immobilize the trailer 24. The one or more brakes may include a service brake 260 and/or a parking brake 262.

Figure 4:
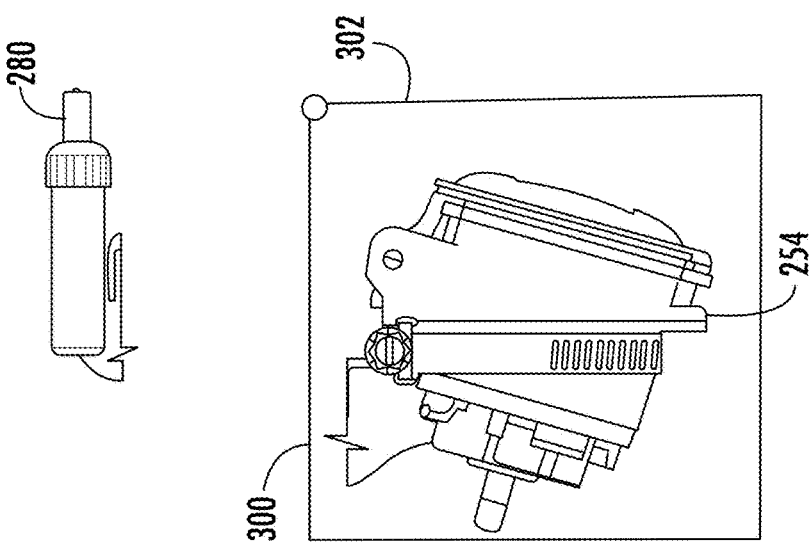
FIG. 4 depicts a socket and a switch according to an example embodiment.

Referring to FIG. 4, the socket 254 is mounted in an enclosure 300 that is closed by an access panel 302. The enclosure 300 may be located on the TRU 26 or the trailer 24. To mate the connector 252 (FIG. 5) with the socket 254, the access panel 302 is moved from the closed position shown in FIG. 4 to an open position shown in FIG. 5. When the access panel 302 is moved to the open position, the access panel 302 contacts the switch 280 causing the switch 280 to change state (e.g., opens or closes). The controller 230 detects the change of state of the switch 280, and sends a command to the T-EBS 220 to apply one or more brakes (e.g., the service brake 260 and/or the parking brake 262) to prevent movement of the trailer 24. This prevents the trailer 24 from being moved when shore power 250 is connected to the TRU 26. When the access panel 302 is closed, controller 230 detects the change of state of the switch 280, and sends a command to the T-EBS 220 to remove the one or more brakes (e.g., the service brake 260 and/or the parking brake 262) to allow movement of the trailer 24.

Figure 5:
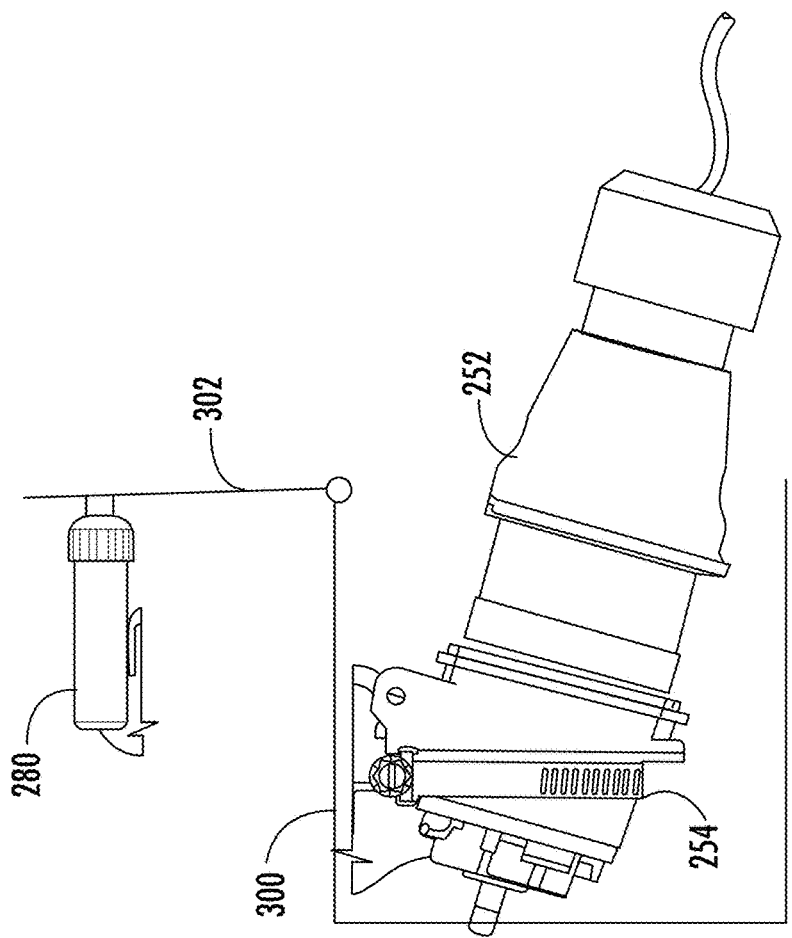
FIG. 5 depicts the socket and the switch according to an example embodiment.

The switch 280 in FIGS. 4 and 5 is a physical contact switch, but other types of switches may be used to detect that the access panel 302 has been opened or closed. For example, a proximity switch (e.g., Hall effect sensor) may be used to determine that the access panel 302 has been opened or closed. Other types of switches, such as capacitive sensors, optical sensors, etc., may be used to detect that the access panel 302 has been opened or closed.

The access panel 302 in FIGS. 4 and 5 is depicted as hingedly connected to the enclosure 300. The access panel 302 may be mounted in other configurations, such as a sliding configuration. The access panel 302 may be biased closed, for example, by a spring.

The embodiments described herein are directed to an example of a trailer fitted with a transport refrigeration unit. Embodiments disclosed herein may also be applicable to other vehicles having electrical connections to shore power.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
    a trailer having a brake;
    a transport refrigeration unit mounted to the trailer, the transport refrigeration unit configured to cool a cargo compartment of the trailer
    a socket configured to provide a connection with shore power, the socket contained in an enclosure having an access panel;
    a switch configured to detect opening and closing of the access panel;
    a controller in communication with the switch, the controller configured to engage or disengage the brake in response to the switch.

2. The transport refrigeration system of claim 1 wherein the switch comprises a physical contact switch.

3. The transport refrigeration system of claim 1 wherein the switch comprises a magnetic switch.

4. The transport refrigeration system of claim 1 wherein the brake comprises a trailer electronic brake system.

5. The transport refrigeration system of claim 1 wherein the brake comprises a service brake.

6. The transport refrigeration system of claim 1 wherein the brake comprises a parking brake.

7. The transport refrigeration system of claim 1 wherein the access panel is hingedly attached to the enclosure.

8. The transport refrigeration system of claim 1 wherein the access panel is biased in a closed position.

9. A method of controlling a brake of a trailer, the trailer comprising a transport refrigeration unit mounted to the trailer, the method comprising:
    actuating the brake in response to a switch, the switch configured to detect opening and closing of an access panel to a socket, the socket configured to provide a connection between the transport refrigeration unit and shore power.

10. The method of claim 9 wherein the switch comprises a physical contact switch.

11. The method of claim 9 wherein the switch comprises a magnetic switch.

12. The method of claim 9 wherein the brake comprises a trailer electronic brake system.

13. The method of claim 9 wherein the brake comprises a service brake.

14. The method of claim 9 wherein the brake comprises a parking brake.

15. The method of claim 9 wherein the access panel is hingedly attached to the enclosure.

16. The method of claim 9 wherein the access panel is biased in a closed position.

* * * * *